United States Patent [19]

Gershnow et al.

[11] 3,985,212
[45] Oct. 12, 1976

[54] SPRING WRAP CLUTCH WITH BRAKE

[75] Inventors: Abraham H. Gershnow, Nashua; Alexander F. Vitale, Pelham, both of N.H.

[73] Assignee: Centronics Data Computer Corporation, Hudson, N.H.

[22] Filed: July 24, 1974

[21] Appl. No.: 491,335

[52] U.S. Cl. ............................. 192/12 BA; 192/26; 192/33 C; 188/82.7
[51] Int. Cl.[2] ................... F16D 67/06; F16D 11/02
[58] Field of Search ............... 192/12 BA, 33 C, 26, 192/81

[56] References Cited
UNITED STATES PATENTS

| | | | |
|---|---|---|---|
| 2,475,432 | 7/1949 | Marihart | 192/12 BA |
| 2,885,042 | 5/1959 | Frechette | 192/12 BA |
| 3,021,512 | 2/1962 | Welsh et al. | 192/12 BA |
| 3,104,745 | 9/1963 | Wipke | 192/81 |
| 3,277,986 | 10/1966 | Beare | 192/26 |
| 3,376,963 | 4/1968 | Schaefer | 192/12 BA |
| 3,602,348 | 8/1971 | Mohr | 192/33 |

*Primary Examiner*—Benjamin W. Wyche
*Attorney, Agent, or Firm*—Ostrolenk, Faber, Gerb & Soffen

[57] ABSTRACT

A clutch assembly which provides selective output drive especially adapted for use in incrementally driving a platen and tape reader mechanism for use in printers. An output gear is freewheelingly mounted upon the clutch assembly driven shaft and is mechanically linked to a free wheeling cam through a helical spring wound tightly about the driven shaft. The free wheeling cam is provided with at least one notch for selective engagement by a pivotally mounted solenoid actuated latch. When the latch is disengaged from the free wheeling cam, the spring is rotated by the driven shaft and imparts its rotation to both the output gear and the cam. Upon actuation of the solenoid, the latch member engages the free wheeling cam member to restrain it from rotation, causing the helical spring to unwrap itself (i.e., loosen) about the shaft and stop the output gear from rotating. The spring, however, attempts to rotate the output gear in the reverse direction, which action is prevented by backstop engaging a shoulder in the cam surface provided in the output gear. The clutch assembly is characterized by its simplicity of design and ease of manufacture and assembly.

8 Claims, 3 Drawing Figures

TO CONTROL MEANS-40

SPRING WRAP CLUTCH WITH BRAKE

BACKGROUND OF THE INVENTION

Line printers typically incorporate mechanical means for selectively and incrementally or continuously moving a paper document upon completion of each line of print. The selective advancement of the paper document is typically obtained through engaging clutch means to selectively impart rotation to the paper platen advancing tractor assemblies or other like mechanism. The clutch assemblies presently in use, however, are characterized by their complexity of design and resultant high cost of manufacture and assembly.

BRIEF DESCRIPTION OF THE INVENTION

The present invention is characterized by providing a highly simplified clutch assembly especially adapted for use in selectively and either incrementally or continuously driving the line feed assembly in a printer to thereby provide an assembly of significantly reduced cost due to the reduced cost in individual components and the assembly thereof.

The clutch assembly of the present invention is of the "spring wrap" type in which a driven shaft has mounted thereto a combined backstop cam and output gear normally rotated with the driven shaft by means of a helical spring which is wound tightly about the shaft. The output gear/cam member and a second cam free-wheelingly mounted on the driven shaft are coupled to opposite ends of the helical spring wound tightly about the shaft and extending between the backstop cam and the free-wheeling cam. The free-wheeling cam is provided with notches cooperating with a pivotally mounted spring biased latch member selectively engageable with one of the notches. Upon engagement thereof the free-wheeling cam is restrained from rotating causing the helical spring to unwrap itself about the driven shaft and thereby prevent rotation thereof. The spring attempts to prevent unwinding by attempting to rotate the backstop cam in the reverse direction. This reverse rotation is prevented by a backstop latch which engages a shoulder in the cam surface of the backstop cam to maintain the spring, the backstop cam, and the cam member free-wheeling relative to the driven shaft. Actuation of the latch solenoid causes a release of the latch from a cooperating cam notch in the free-wheeling cam, thereby enabling the helical spring to tightly wind itself about the driven shaft and thereby impart rotation to the output gear and cam member and thereby transmit this rotational force to the paper document advancing means. The backstop cam is provided with notches coaligned with the notches in the cam member for cooperating with the backstop latching member to prohibit the output gear from being driven in the reverse direction.

The simplicity of design provides a clutch assembly of a significantly reduced number of components which are inexpensive to manufacture and assemble.

BRIEF DESCRIPTION OF THE DRAWINGS AND OBJECTS

It is therefore one object of the present invention to provide a novel spring wrap clutch assembly of simplified design.

Another object of the present invention is to provide a novel clutch assembly especially adapted for use in printers and the like and which employs a spring wrap clutch arrangement.

The above as well as other objects of the present invention will become apparent when reading the accompanying description and drawings in which.

DETAILED DESCRIPTION OF THE INVENTION.

Figure 1:
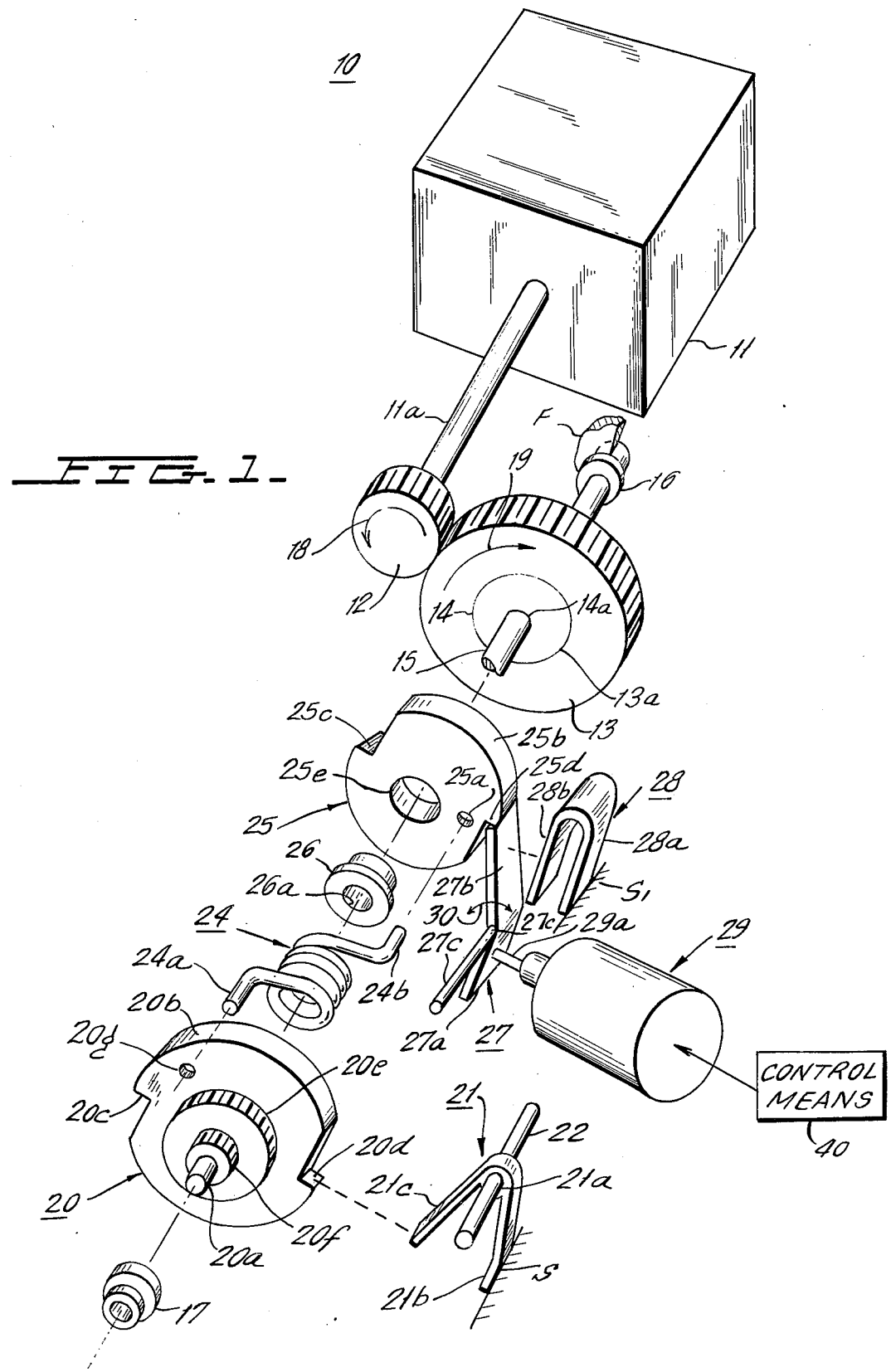
FIG. 1 shows a perspective view of a clutch assembly designed in accordance with the principles of the present invention.

FIG. 1 shows a clutch assembly 10 especially adapted for use in driving a line feed and paper tape reader mechanism of a printer. A motor 11 is provided with an output shaft 11a having a gear 12 mounted to its free end. Gear 12 is preferably a wide faced gear and, due to the nature of the light load imposed upon the motor, is preferably a molded plastic gear. Gear 12 meshes with a gear 13 which is also preferably a wide-faced plastic gear and having a large central opening 13a for receiving a metallic (preferably steel) insert 14 which may be press-fitted into opening 13a and which is provided with an opening 14a locked to driven shaft 15.

Shaft 15 is journalled between a bushing 16 and backstop cam 20 provided at its respective free ends. Bushing 16 may be mounted within a supporting wall of the machine frame (not shown for purposes of simplicity) so as to free-wheelingly mount shaft 15. Upon rotation of motor shaft 11a and gear 12 in the counter-clockwise direction shown by arrow 18, gear 13 and shaft 15 are rotated in the clockwise direction as shown by arrow 19.

A one piece plastic molded member 20 which serves the dual functions of a backstop cam and output gear member is fitted to the end of shaft 15 remote from gear 13 and is provided with a central projection 20a fitted into bushing 17 which is mounted in machine frame F so as to free-wheelingly mount member 20 relative to both shaft 15 and frame F.

Member 20 is provided with a cam surface 20b having a pair of notches 20c and 20d arranged to cooperate with a substantially U-shaped resilient backstop latch member 21 having a central opening 21a for mounting member 21 upon a pin 22 which may be secured to the machine frame in any suitable manner. Arm 21b of resilient member 21 rests against a stationary surface S which may also form part of the machine frame. Latch arm 21c, due to the resilient nature of member 21, is biased toward cam surface 20b so as to selectively engage one of the notches 20c or 20d in the manner to be more fully described.

Member 20 is further provided with a pair of gear surfaces 20e and 20f of different diameters for transmitting rotation of member 20 to utilization devices in a manner to be more fully described. Member 20 is still further provided with an opening 20g for receiving one end projection 24a of a helical spring 24 which is tightly wrapped about shaft 15. The opposite end projection 24b extends through an opening 25a in free-wheeling cam member 25, which member is a substantially circular shaped member having a cam surface 25b provided with notches 25c and 25d. Member 25 is provided with a central opening 25e for receiving a bronze bushing 26 having a central opening 26a for receiving shaft 15. Member 26 is press-fitted into cam member 25 and is adapted to free-wheelingly rotate about shaft 15.

A latch member 27 having a pair of arms 27a and 27b is provided with a central opening 27c for receiving pivot pin 27d which may be secured to the machine frame in any suitable manner so as to pivotally mount latch 27. U-shaped spring means 28 has one of its arms 28a resting against a surface $S_1$ of the machine frame while its other arm 28b bears against arm 27b of latch member 27.

A solenoid 29 has its armature mechanically linked to arm 27a of latch 27 by member 29a. A control circuit 40 selectively activates solenoid 29.

The operation of the clutch assembly is as follows:

Motor 11 may be continuously driven so as to rotate its output shaft 11a and gear 12 in the counterclockwise direction as shown by arrow 18. Gear 12 meshes with gear 13 to drive gear 13 and shaft 15 in the clockwise direction as shown by arrow 19, causing member 20 to likewise rotate in the clockwise direction. Let it be assumed that solenoid 29 has been actuated by control circuit 50 to pivot latch 27 in the clockwise direction as shown by arrow 30 so as to release the upper edge of arm 27b from engagement with either of the notches 25c or 25d.

The clockwise rotation of shaft 15 is imparted to spring 24 which is normally tightly wound about shaft 15 causing spring 24 to rotate in the same direction which, in turn, imparts rotation to output gear 20 and to cam member 25 which is free to rotate since latch arm 27b is released from engagement with either of the notches 25c or 25d.

Upon release of solenoid 29, latch member 27 operates under the influence of biasing member 28. Arm 28b bears against arm 27b of latch member 27 causing the latch member to pivot in the counterclockwise direction so that its upper edge engages one of the notches, for example, notch 25d. The cam 25 operates on spring 24 through projection 24b to cause the spring to unwrap itself from shaft 15. This unwrapping causes the opposite projection 24a to attempt to rotate output gear member 20 in the counterclockwise direction. The rotation imparted to member 20 through helical spring 24 causes the backstop latch arm 21c to engage shoulder 20d and thereby prevent gear member 20 from experiencing any further counterclockwise rotation and thereby cause spring 24 to unwrap, which in turn halts the rotation of member 20. Thus, the output gear portions 20e and 20f of member 20 no longer impart any rotary movement to the utilization devices connected thereto.

Member 20 may again be driven into rotation by energization of solenoid 29 causing latch member 27 to pivot in a clockwise direction about pin 27d releasing the free edge of latch arm 27b from notch 25d. This causes spring 24 to tightly wind itself about shaft 15 and thereby rotate both gear member 20 and cam 25 in the clockwise direction (19).

Solenoid 29 may be energized by control means 40 for a brief time interval sufficient to release latch arm 27b from notch 25d and may then quickly be deenergized so as to enable notch 25d to pass the free edge of latch arm 27b. Upon deenergization (just after shoulder 25d passes the free end of latch arm 27b), spring member 28 will cause latch arm 27b to make sliding engagement with the cam surface 25b until notch 25c moves into engagement with the free edge of arm 27b, at which time cam member 25 will again be prevented from experiencing any further rotation under control of spring 24. Thus, the actuation and release of solenoid 29 enables cam 25 to rotate through one-half of a full revolution. Solenoid 29 may again be energized by control means 40 as notch 25c approaches the free edge of latch arm 27b to permit cam 25 to experience one full revolution of rotation or alternatively, solenoid 29 may be retained energized over a time interval of a length equal to one full revolution of cam 25. By selective energization of solenoid 29, cam member 25 may be controlled to rotate through any integral multiple of a half-revolution, for example, to permit a paper document to be stepped one or more lines by appropriate control of solenoid 29.

Resilient backstop member 21 functions to prevent member 20 from experiencing rotation in the reverse or counterclockwise direction. During normal (clockwise) rotation of member 20, arm 21c of resilient biasing member 21 slidably engages cam surface 20b. If, as a result of the unwrapping of helical spring 24 about shaft 15, member 20 attempts to rotate in the counterclockwise direction, rotation in the counterclockwise direction will be prevented by the free edge of arm 21c engaging with one of the notches 20c or 20d in cam surface 20b.

Figure 2:
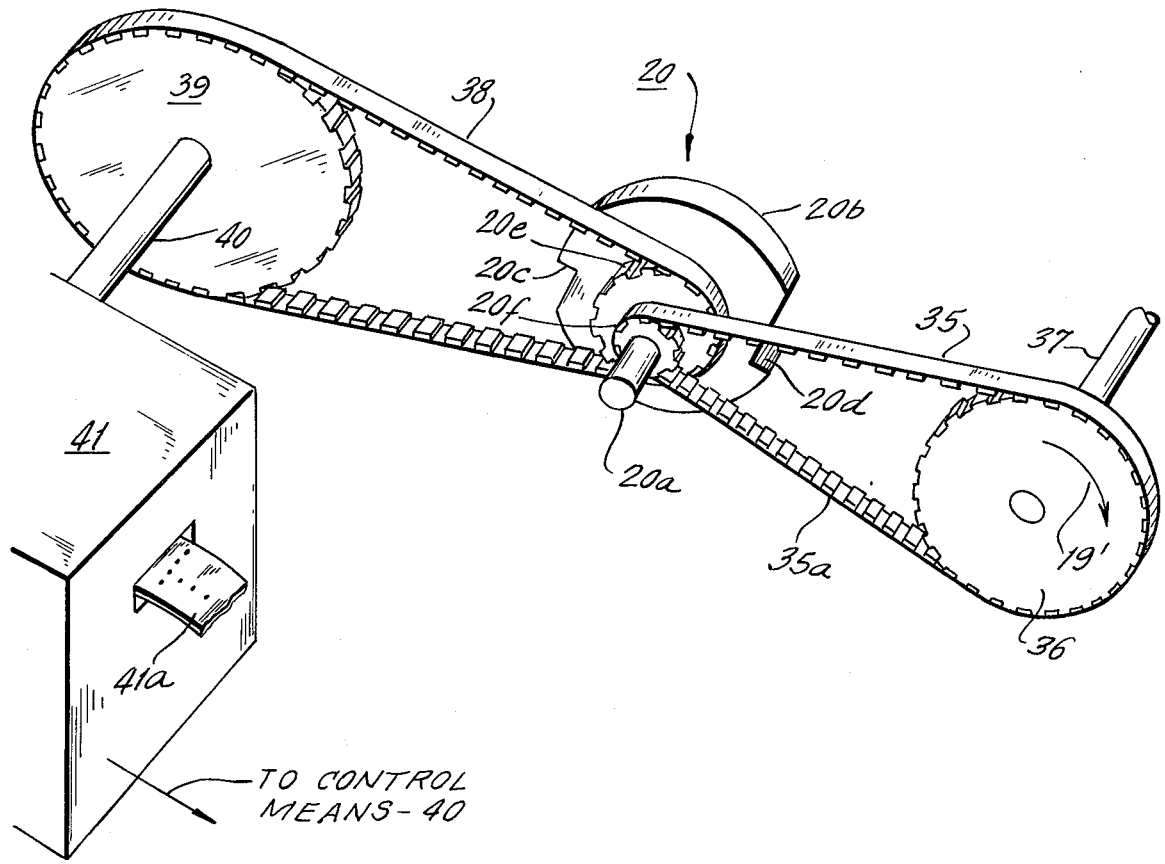
FIG. 2 shows a perspective view of the clutch assembly output gear and the manner in which it is utilized to drive a printer paper advancing means and paper tape reader.
Figure 3:
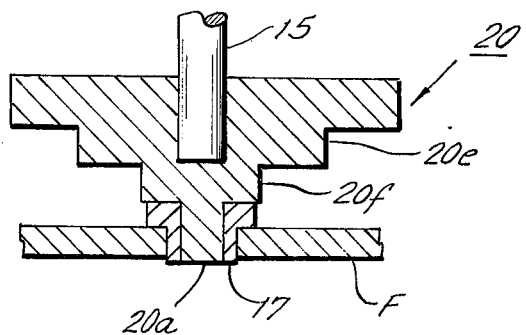
FIG. 3 shows a detailed sectional view of the output gear of FIG. 1.

FIG. 2 shows the manner in which rotation of member 20 may be imparted to a printer paper drive mechanism and paper tape reader. A timing belt 35 having a toothed inner surface 35a is entrained about gear 20f and a gear 36 mounted upon and adapted to impart rotation to the platen jack shaft 37 to rotate gear 36 and jack shaft 37 in the clockwise direction shown by arrow 19'. A second multiple toothed timing belt 38 is entrained about gear 20e and a gear 39 which is mounted upon shaft 40 and serves to drive a paper tape reader assembly 41. The paper tape reader assembly 41 is utilized to control the number of line feed increments for advancing the paper document typically whenever a multiple number of line space advancements are desired, for example, to advance the paper document over a large number of steps or to advance the paper document to a location representing the top of the next form. The output of reader 41 is coupled to control means 40 to control the number of lines which the paper document is advanced in accordance with a preprogrammed tape 41a. Control means 40 may also be activated by line feed control codes which may be received by the printer from a communications link, the line feed code normally following the print signal for the last character of the line being printed.

Whereas the clutch assembly of the present invention has been described as being especially advantageous for use in operating the paper advancement mechanism and paper tape reader assembly of a printer, it should be understood that the clutch assembly may be utilized for other applications. The simplicity of the design enables many of the components to be molded or otherwise machined from plastic such as, for example, the gears 12, 13 and 20, as well as the resilient biasing members 27 and 28.

It can be seen from the foregoing description that the present invention provides a novel clutch assembly of simplified design capable of incrementally or continuously driving an output gear through selective operation of a solenoid assembly to provide for the desired incremental or continuous drive. Although the preferred embodiment described herein teaches each incremental advance as being one-half of a full revolution, it should be understood that cam member 25 may be designed with any desired number of cam notches to provide for incremental drive of a single revolution (through the use of only one notch), incremental drive of a fraction of a fraction (through the use of two or more notches along the cam surface) or incremental drive of an integral multiple of the full or fractional revolution by appropriate activation of the solenoid which operates the latch cooperating with the free-wheeling cam member.

Although there has been described a preferred embodiment of this novel invention, many variations and modifications will now be apparent to those skilled in the art. Therefore, this invention is to be limited not by the specific disclosure herein but only by the appending claims.

The embodiments of the invention in which an exclusive privilege or property is claimed are defined as follows:

1. A clutch assembly for selectively coupling rotary motion from a drive source to an output, said clutch assembly comprising:
   a shaft continuously rotated in a first direction by said drive source;
   a first gear member free-wheelingly mounted on said shaft;
   a helical spring encircling and normally tightly wound about said shaft;
   a first end of said spring being secured to said first gear member;
   a cam member being free-wheelingly mounted upon said shaft;
   the opposite end of said spring being secured to said cam member to normally couple rotation of said shaft to said cam member and said gear member;
   said cam member having a cam surface including at least one shoulder;
   a pivotally mounted latch arm;
   a U-shaped resilient member bearing directly against said latch arm, said resilient member normally biasing said latch arm toward a first position against said cam surface whereby the free edge of said latch arm engages said shoulder to prevent rotation of said cam member and said opposite end of said spring;
   said helical spring being caused to unwrap itself about said shaft when said latch arm is in said first position to prevent said cam member and said gear member from rotating;
   one-way backstop means for preventing said gear member from rotating in a direction opposite said first direction to enable said spring to loosen itself about said shaft whenever said cam member is latched while freely permitting rotation in the first direction;
   solenoid means having an armature directly mechanically connected to said latch arm;
   said solenoid means driving said latch arm against the force of said resilient member and towards a second position displaced from said cam surface when said solenoid means is energized to enable said cam member and said gear member to resume rotation under control of said spring.

2. The assembly of claim 1 comprising control means for energizing said solenoid means for a time interval sufficient to disengage said latch arm from said cam surface, said time interval being less than the time required for said cam member to complete one full revolution to thereby halt said shaft from rotating beyond substantially one revolution.

3. The assembly of claim 1 wherein said cam surface is provided with N equispaced shoulders, where N is an integer greater than 2; control means for energizing said solenoid means for a time interval sufficient to disengage said latch arm from said cam surface, said time interval being less than the time required for said cam member to complete $1/N^{th}$ revolution to thereby halt said shaft from rotating beyond substantially $1/N^{th}$ revolution.

4. The assembly of claim 1 wherein said gear member is provided with at least one toothed gear surface;
   means for coupling said toothed gear surface to an output.

5. The assembly of claim 1 wherein said gear member is provided with first and second toothed gear surfaces;
   means for coupling each of said toothed gear surfaces to one of first and second outputs.

6. The assembly of claim 1 wherein said gear member is further provided with a cam surface having at least one shoulder,
   said backstop means including an arm slidably engaging said gear member cam surface and adapted to engage the shoulder of said gear member cam surface to prevent rotation of said gear member in a direction opposite said first direction to thereby enable said spring to unwrap whenever said cam member is prevented from rotating.

7. The assembly of claim 1 wherein said gear member and said cam member are each provided with openings displaced from their central openings;
   said helical spring having a pair of projections extending in opposite directions, each of said projections extending into an associated one of said displaced openings.

8. A clutch assembly for selectively coupling rotary motion from a drive source to an output, said clutch assembly comprising:
   a shaft continuously rotated in a first direction by said drive source;
   a bearing free-wheelingly supporting one end of said shaft;
   a first gear member having an opening only partially therethrough for free-wheelingly receiving the opposite end of said shaft and having a projection coaxial with the axis of said opening and extending away from the opposite end of said shaft;
   a second bearing receiving said projection and free-wheelingly mounting said first gear member relative to said shaft;
   a helical spring encircling and normally tightly wound about said shaft;
   a first end of said spring being secured to said first gear member;
   a cam member being free-wheelingly mounted upon said shaft;
   the opposite end of said spring being secured to said cam member to rotate said cam member and said gear member;
   said cam member having a cam surface including at least one shoulder;
   a pivotally mounted latch arm;
   first means normally biasing said latch arm towards a first position against said cam surface whereby the free edge thereof engages said shoulder to prevent rotation of said cam member;

said helical spring being caused to unwrap itself about said shaft when said latch arm is in said first position to prevent said cam member and said first gear member from rotating;

backstop means for preventing said first gear member from rotating in a direction opposite said first direction to enable said spring to loosen itself about said shaft whenever said cam member is latched;

solenoid having an armature mechanically coupled to said latch arm, said solenoid means driving said latch arm against the force of said biasing means towards a second position displaced from said cam surface when said solenoid means is energized to enable said cam member to resume rotation under the control of said spring.

* * * * *